J. B. Wickersham,
Lubricator.
No 82,667. Patented Sep. 29, 1868
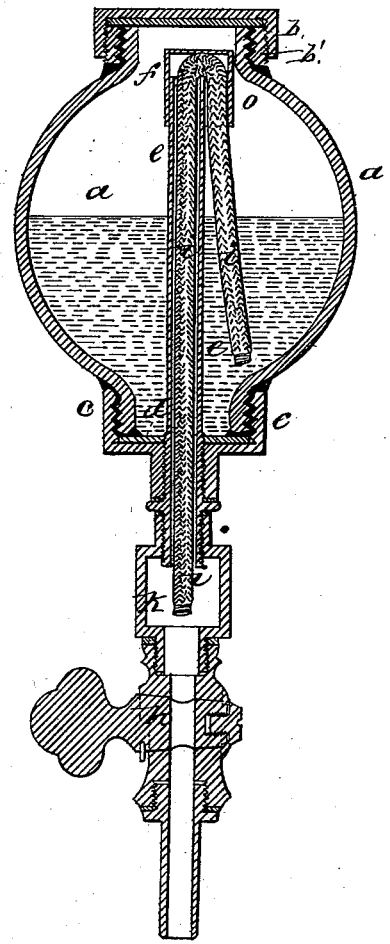

United States Patent Office.

JOHN B. WICKERSHAM, OF PHILADELPHIA, PENNSYLVANIA.

Letters Patent No. 82,667, dated September 29, 1868.

---

IMPROVEMENT IN LUBRICATORS.

---

The Schedule referred to in these Letters Patent and making part of the same.

---

TO ALL WHOM IT MAY CONCERN:

Be it known that I, JOHN B. WICKERSHAM, of Philadelphia, in the State of Pennsylvania, have invented and made a certain new and useful Improvement in Oil-Cups for Lubricating Machinery; and I do hereby declare the following to be a full, clear, and exact description of the said invention, reference being had to the annexed drawing, making part of this specification, wherein—

Figure 1 is a vertical section of my improved oil-cup, and

Figure 2 is an inverted plan of the cap for the tube of the oiler.

Similar marks of reference denote the same parts.

In Letters Patent granted to me for an improvement in lubricators, dated October 22, 1867, a metal tube and socket are employed with a glass oil-receptacle.

In almost all of the lubricators heretofore made, the metallic portions are of brass or copper. I have discovered, practically, that with almost all kinds of oil, the brass or copper renders the same of a greenish color, and frequently of a gummy consistence, that does not properly lubricate, and is liable to interfere with the capillary action of the feeding-wire and fibrous covering.

The nature of my present invention consists in a lubricator formed with a glass reservoir, and a metallic tube and cap, of white metal or pewter, that is not affected by the oil; hence said oil is not discolored or rendered gummy, but retains its purity and limpid condition, and the capillary feeder is not obstructed by the impurities and coloring-matter of the oil, resulting from the action thereof upon brass or copper tubes or mountings for the glass receptacle.

In the drawing, $a$ is the glass receptacle or reservoir, formed with an opening at its upper and lower portions, on the outsides of which are screw-threads.

$b$ is the metal cap for the upper part of the reservoir, by the removal of which the reservoir may be filled. This metal cap $b$ screws upon the outside of a collar, $b'$, that is screwed upon the glass neck and rendered tight by suitable cement, and a washer introduced between the cap, $b$, and collar $b'$, renders the parts tight, for an object hereafter mentioned.

$c$ is a cap of metal, into which the lower neck of the glass reservoir $a$ screws, and the parts are rendered perfectly tight by a leather washer, $d$, and by packing cement between the metal of the cap, $c$, and the glass, $a$.

The tube $e$ is screwed into the lower part of the cap, $c$, and extends up into the oil-space in the reservoir $a$, to near the cap, $b$, and into this the capillary wire or feeder $i$ is introduced to draw over the oil and lubricate the mechanism to which it is applied.

I make use of a sleeve, $f$, set over the upper end of the tube $e$, and I provide a swell, $o$, upon one side, that allows the capillary wire or feeder to pass up and over into the tube $e$ freely, but prevents the oil passing over into said tube $e$, in consequence of any agitation of the lubricator, as in cranks and connecting-rods of engines and loose pulleys.

These metallic parts are all made of white metal or alloy, resembling pewter, in order that the oil may not be injured or discolored, as in brass or copper vessels or lubricators.

The capillary feeder $i$ is made of two or more wires within a fibrous tube, formed by braiding cotton or other fibre around them, and there is a space left between such wires that forms a tube, that acts as a siphon, (see fig. 3,) or said tube may be made of a strip of metal, bent up into a tubular form, but with the seam open, so as not to make a tight pipe, as shown in fig. 4.

In order to set this capillary feeder in efficient operation, it is important that it be immersed in the oil, so as to drive out any air. To effect this the oil-cup should be filled up as high as the top of the said capillary feeder, and to prevent oil flowing rapidly down the tube $e$, I apply a cock at $h$.

When this cock is closed, the oil will be shut off, and thus prevent waste when not in use, and the siphon-action continuing, the chamber $k$ and the tube $e$ will be filled almost to the level of the oil in the receptacle $a$. When the cock $h$ is opened, the body of oil, as it descends in the tube $e$ and chamber $k$, will cause the aforesaid capillary feeder to commence its regular supply, unless the oil is so nearly exhausted as to require replenishing. When the oil has run out of the chamber $k$, the supply will be, drop by drop, from the capillary feeder.

In cases where my said feeder is applied to a revolving pulley or wheel, the screw-cap $b$ prevents the oil wasting out either by inversion of the cup or by centrifugal force, and the cap or sleeve $f$ and capillary feeder insure a regular supply to the axle or journal.

What I claim, and desire to secure by Letters Patent, is—

1. The sleeve $f$, formed with a swell upon one side for the introduction of a feeder, in combination with the tube $e$ and reservoir $a$, for the purposes and as specified.

2. A lubricator formed with the tube $e$ of white metal, for the purposes and as specified.

3. The combination of the glass reservoir $a$ and screw-neck at its lower end, with the cup $c$ and washer $d$, rendered permanently tight by cement, as set forth.

4. A capillary feeder formed by metal wires or rods, or a tubular strip of metal enclosed in a fibrous covering, so as to form a siphon, as and for the purposes set forth.

5. The cock $h$ and chamber $k$, in combination with a capillary feeder and oil-cup, substantially as set forth.

In witness whereof, I have hereunto set my signature, this fifteenth day of June, A. D. 1868.

J. B. WICKERSHAM.

Witnesses:
   S. A. SPOFFORD,
   LOUIS WAGNER.